United States Patent [19]

Srail

[11] 3,894,996

[45] July 15, 1975

[54] THIURAM ACCELERATOR SYSTEMS WITH BLOCKED ISOCYANATES

[75] Inventor: Raymond C. Srail, Parma, Ohio

[73] Assignee: The B. F. Goodrich Company, Akron, Ohio

[22] Filed: June 25, 1973

[21] Appl. No.: 373,504

Related U.S. Application Data

[63] Continuation-in-part of Ser. No. 118,173, Feb. 23, 1971, abandoned.

[52] U.S. Cl............... 260/79.5 P; 260/23.7 M; 260/46.5 G; 260/79.1; 260/79.5 A; 260/79.5 B; 260/793; 260/794; 260/887; 260/894

[51] Int. Cl............ C08c 11/48; C08d 9/08

[58] Field of Search ..... 260/79.5 R, 79.5 A, 79.5 B, 260/793, 794, 887, 894

[56] References Cited

UNITED STATES PATENTS

| 1,904,573 | 4/1933 | Tuley | 260/794 |
| 3,135,716 | 2/1972 | Uraneck | 260/77.5 CR |

Primary Examiner—Christopher A. Henderson, Jr.
Attorney, Agent, or Firm—J. Hughes Powell, Jr.; Alan A. Csontos

[57] ABSTRACT

Improved accelerator systems comprising a thiuram compound and an amine-blocked diisocyanate are provided for vulcanization of polymers. These accelerator systems are stable during processing, thereby minimizing scorch of the polymer, but at vulcanization temperature provide very rapid cures.

8 Claims, No Drawings

THIURAM ACCELERATOR SYSTEMS WITH BLOCKED ISOCYANATES

CROSS REFERENCE TO RELATED APPLICATION

This application is a continuation-in-part of application, Ser. No. 118,173 filed Feb. 23, 1971 now abandoned.

BACKGROUND OF THE INVENTIONN

Various thiuram compounds, such a dithiocarbamates and thiuram sulfides, are known accelerators used throughout the rubber industry to provide rapid cures for a wide variety of rubbers and elastomers. These compounds reduce the time required for vulcanization so that increased outputs as well as more uniform cures are obtained. It would be advantageous if the various thiuram compounds could be made even more active so that more rapid cures would result. It would be particularly desirable if with these activated thiuram accelerator systems there was little or no effect on the scorch times at temperatures typically employed for processing elastomers. For the rubber compounder this would minimize or completely eliminate any change in the compounding and processing of the rubber stock as is often required when more active accelerators are employed.

Activators for various accelerators are known. For example, diphenyl guanidine and its derivatives are often combined with other accelerator compounds to obtain improved cure rates. However, both components of the mixture function as useful accelerators and while the cure rate is generally improved there is a proportional decrease in the scorch time at lower temperatures. It would be highly advantageous to have an accelerator system wherein as the cure rate is increased the scorch time is not proportionately decreased.

SUMMARY OF THE INVENTION

Compositions comprising (1) a sulfur vulcanizable rubber, (2) sulfur or a sulfur donor, (3) optionally, a metal vulcanization activator, and (4) an accelerator system consisting essentially of (a) a thiuram compound accelerator and (b) a blocked isocyanate of (i) an amine having a pK dissociation constant of about 4 or below and (ii) a diisocyanate selected from diphenyldiisocyanates and aromatic diisothiocyanates, have an improved balance of scorch safety at processing temperatures and rapid cure at vulcanization temperatures.

DETAILED DESCRIPTION

The improved accelerator systems of the present invention consists essentially of an amine-blocked diisocyanate and a thiuram compound, the combination providing an improved balance of scorch safety and rapid cure. The accelerator systems of this invention are useful with any rubber, natural or synthetic, capable of sulfur cure.

Especially useful rubbers for the purposes of the present invention are derived from conjugated diolefins containing from 4 to 6 carbon atoms such as 1,3-butadiene, isoprene, piperylene, 2,3-dimethylbutadiene-1,3 and the like. The conjugated diolefin will constitute from about 30% to 100% by weight of the overall polymer composition, and may contain 80% or more of the 1,4-addition product which has predominantly one stereo configuration (cis- or trans-). Typical conjugated diolefin-derived homopolymers and copolymers for which the present accelerator systems are useful include: natural rubber and synthetic natural rubber (cis-polyisoprene), trans-polyisoprene, polybutadiene, chloroprene polymers (Neoprene), butyl rubbers (copolymers of isobutylene and isoprene), GR-S (copolymers of styrene and butadiene), nitrile rubbers (copolymers of butadiene and acrylonitrile) and copolymers of conjugated diolefins with lower alkyl acrylates or lower alkyl methacrylates or similar monomers. Such rubber compositions contain olefinic unsaturation ($>C=C<$) constituting from about 0.5% to 50% by weight of the overall polymer composition.

The present accelerator systems are also useful for polymers derived from $\alpha$-monoolefins which contain olefinic unsaturation as a result of polymerizing one or more monomers containing multiple unsaturation. Such polymers include, for example, ethylene-propylene-diene terpolymers and ethylene-butene-diene terpolymers wherein the diene monomers will typically be 1,4-hexadiene, methyl-1,4-hexadiene, a 1,4,9-decatriene, a methyl-1,4,9-decatriene, dicyclopentadiene, vinylcyclohexene, vinyl norbornene, ethylidene norbornene, methylene-norbornene, methyl norbornadiene, methyltetrahydroindene and the like. $\alpha$-Olefin-derived polymers of this type will contain about 0.3% to 10% by weight of the diene monomer polymerized with about 30% to 80% by weight ethylene and 20% to 70% by weight propylene or butene-1.

In addition to the above-mentioned preferred rubber compositions derived from conjugated diolefins and $\alpha$-monoolefins the present accelerator systems are also effective to obtain rapid cure with minimum scorch with other sulfur-vulcanizable polymers such as polyoctenamers and polypentenamers, silicone rubbers, thiokols, polyacrylate rubbers and other related compositions. Any sulfur curable polymers, that is, a polymer capable of forming sulfur cross-links will be effectively cured and is within the scope of the present invention.

The imporved accelerator systems of this invention contain as one of the essential components a thiuram compound, that is, a compound having as part of its molecular structure one or more groups of the type

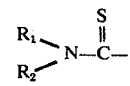

wherein $R_1$ and $R_2$ are, independently, an alkyl radical containing from 1 to 6 carbon atoms, a cycloakyl group containing from 5 to 7 carbon atoms or an aryl, aralkyl or alkaryl group containing 6 to 10 carbon atoms or $R_1$ and $R_2$ may jointly form a bivalent hydrocarbon radical containing from 4 to 7 carbon atoms. More specifically the thiuram compound will be a dithiocarbamate of the formula

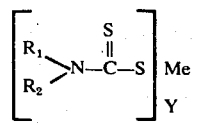

wherein $R_1$ and $R_2$ are the same as defined above, $y$ is an integer from 1 to 4 and Me is a metal selected from the group consisting os sodium, potassium, zinc, copper, lead, cadmium, bismuth, tellurium or selenium; or a thiuram sulfide of the formula

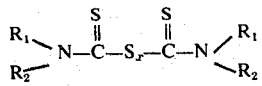

wherein $R_1$ and $R_2$ are the same as defined above and $x$ is an integer from 1 to 4.

Illustrative dithiocarbamates and thiuram sulfides include: sodium dimethyl dithiocarbamate; zinc dimethyl dithiocarbamate; copper dimethyl dithiocarbamate; lead dimethyl dithiocarbamate bismuth dimethyl dithiocarbamate; selenium dimethyl dithiocarbamate; sodium diethyl dithiocarbamate; zinc diethyl dithiocarbamate; sodium dibutyl dithiocarbamate; zinc dibutyl dithiocarbamate; potassium pentamethylene dithiocarbamate; zinc pentamethylene dithiocarbamate; cadmium pentamethylene dithiocarbamate; zinc lupetidine dithiocarbamate; zinc methyl-phenyl dithiocarbamate; zinc dibenzyl dithiocarbamate; sodium cyclohexylethyl dithiocarbamate; tetramethyl thiuram monosulfide; tetramethyl thiuram disulfide; tetramethyl thiuram tetrasulfide; tetraethyl thiuram disulfide; tetrabutyl thiuram monosulfide, dipentamethylene thiuram disulfide; dipentamethylene thiuram tetrasulfide; N,N'-dimethyl-N,N'-diphenyl thiuram disulfide; N,N'-diethyl-N,N'-diphenyl thiuram disulfide; and the like.

Although the above-mentioned dithiocarbamates and thiuram sulfides are especially useful thiuram compounds for the purposes of the present invention, other structurally related compounds which are known vulcanization accelerators such as, for example, N,N'-diphenylguanidinium dibenzyl dithiocarbamate, hexamethylene ammonium hexamethylene dithiocarbamate, piperidinium pentamethylene dithiocarbamate, diphenylcarbanyl dimethyl dithiocarbamate, 2,4-dinitrophenyl dimethyl dithiocarbamate, dimethylammonium dimethyl dithiocarbamate and benzal-bis(dimethyldithiocarbamate) may also be useful.

The amount of thiuram compound present in the rubber will range between about 0.2 to 5 parts by weight based on 100 parts of the rubber. Excellent results are obtained when about 0.5 to 3 weight parts per hundred parts of rubber of the thiuram sulfide or dithiocarbamate are employed. The thiuram compound may be incorporated as such in the rubber or it may be formed "in situ" prior to or during the processing or vulcanization of the rubber.

To obtain optimum advantages of this accelerator system, a vulcanization activator should also be present. Well known vulcanization activators are listed in "Materials and Compounding Ingredients for Rubber", Rubber World, 1970 Edition. These vulcanization accelerators are typically a metal oxide or hydroxide or a metal salt. The activator may be introduced as part of the accelerator compound as in metal dithiocarbamates such as zinc dialkyldithiocarbamate. If the activator is introduced in the form of a metal oxide about 1 to 10 parts and more preferably from about 1.5 to 4 parts per 100 parts rubber will be added. When a metal oxide is employed it is desirable and advantageous to also add a fatty acid having a total carbon atom content ranging from 12 to 24 carbon atoms, such as stearic acid. It is felt that by the addition of such fatty acids the metal is solubilized so that it may better participate in the vulcanization. The amount of fatty acid employed will range from about 0.5 to 5 parts per 100 parts of the rubber. While the incorporation of metal oxide and fatty acid as separate entities is generally preferred based on economic considerations, if desired, a preformed metal salt of a fatty acid containing from 12 to 24 carbon atoms such as zinc laurate, zinc palmitate, zinc stearate or the like may be employed. If preformed metals are employed they will range from about 0.5 to 5 parts per 100 parts rubber and more preferably from about 0.75 to 2 parts. The metal will generally be a divalent metal such as zinc, cadmium, lead, calcium, iron or the like. Best results are obtained when the metal oxide or metal salt is derived from zinc, cadmium or lead. Zinc oxide and zinc fatty acids are especially useful activators for use with the present activator systems.

The present accelerator systems are useful with a wide variety of rubber compositions which may additionally contain conventional processing aids and oils, fillers, reinforcing agents, extenders, curing additives, cure retarders and modifiers and various stabilizers including antioxidants and antiozonants. Any phenolic stabilizer can be employed in any useful amount. When amine stabilizers are present as antiozonants it is preferred that p-phenylenediamines wherein the amine function is sterically hindered such as N-1,3-dimethylbutyl-N'-phenyl-p-phenylenediamine or other sterically hindered amines be employed.

The amine-blocked diisocyanate is formed by the reaction of a diphenyl diisocyanate or an aromatic diisothiocyanate with a diakyl amine or heterocyclic amine. The reaction can be represented as follows

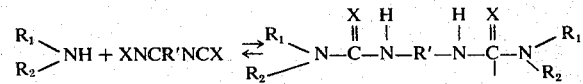

where X is O or S; $R_1$ and $R_2$ are alkyl radicals, either the same or different, containing 1 to 6 carbon atoms or $R_1$ and $R_2$ together with the nitrogen atom form a heterocyclic amine containing 3 to 8 atoms of carbon, nitrogen, oxygen and/or sulfur; and R' is a diphenyl or aromatic radical.

The amines employed are strong amines; i.e., amines having a pK dissociation constant in aqueous solution of about 4 or below (see Lange's Handbook of Chemistry, Revised 10th Edition, Page 1214 (1967) and Handbook of Chemistry and Physics, 45th Edition, Page D-76 (1964)). The amines can be dialkyl amines wherein the alkyl radicals contain 1 to 6 carbon atoms or heterocyclic amines. Examples of the amines are dimethylamine, diethylamine, dipropylamine, diisopropylamine, dibutylamine, diamylamine, methylethylamine, and the like, and heterocyclic amines such as pyrrolidine, piperidine, 2-, 3-, or 4-pipecoline, and the like.

The diisocyanates employed are diphenyl diisocyanates or aromatic diisothiocyanates. Examples of the diphenyl diisocyanates are diphenylmethane-p,p'-diisocyanate, di(3-methylphenyl)methane-p,p'-diisocyanate, diphenylisopropylidene-p,p'-diisocyanate, di(3-methylphenyl)p,p'-diisocyanate, di-(3-methoxyphenyl)-p,p'-diisocyanate, and the like. Examples of aromatic diisothiocyanates are p-phenylene diisothiocyanate, p-toluene diisothiocyanate, p-3-fluorophenyl diisothiocyanate, naphthalene-1,5- diisothiocyanate, naphthalene-1,8-diisothiocyanate and the like.

Blocked isocyanates are known and are readily prepared by reaction between isocyanates and an amine. The reaction is rapid and essentially quantitative. The reaction is normally conducted in a solvent or diluent to control the reaction temperature. Equimolar or a molar excess of amine for each mol of isocyanate group is usually employed. The reaction may be carried out, for example, in a solvent medium as dry toluene. Because of the reactivity of isocyanate groups with water a dry solvent or diluent is employed. The dried reaction products are generally white friable solids.

The amine-blocked diisocyanates of the present invention are distinguished from known blocked isocyanates by their use to prepare unique sulfur vulcanizable compositions having an improved balance of scorch safety and rapid cure rate. This combination of rapid cure and improved scorch safety is obtainable only with the amine-blocked diisocyanates disclosed herein. For example, U.S. Pat. No. 1,904,573 shows the use of alkyl and/or aromatic urea (monoisocyanate) compounds in curing rubber. However, when these compounds were evaluated in rubber compositions they yielded inferior scorch safety compared to the amine-blocked diisocyanates of the present invention. The improved scorch safety results from using the diphenyldiisocyanates or aromatic diisothiocyanates to prepare the amine-blocked diisocyanate. There is a definite need for greater scorch safety in rubber compositions, particularly in view of the use of fast-acting accelerators, carbon blacks and other compounding ingredients which tend to accelerate cure, and the use of higher processing and vulcanizing temperatures to increase product output.

When the amine-blocked diisocyanate breaks down at vulcanization temperatures, the liberated amine must act quickly and efficiently to cure the rubber composition. The use of the disclosed dialkylamines and heterocyclic amines, both types further having a pK dissociation constant of about 4 or below, provides rapid cure at vulcanization temperature. Weak amines provide a substantially slower cure rate. For example, diphenylamine is a weak amine, having a pK value of 13.1. When a diphenylamine blocked isocyanate was used in a rubber composition the composition exhibited a substantially longer cure time at vulcanization temperatures than compositions employing the strong amine-blocked diisocyanates of the present invention.

The total amount of the thiuram compound and amine-blocked diisocyanate in the rubber will range between about 0.5 to 8 parts per 100 parts of the rubber and more preferably from about 1 to 5 parts per 100 parts of rubber. The weight ratio of the amine- or imine-blocked isocyanate to the thiuram compound will range between 0.2:1 to 4:1 and more preferably from about 0.5:1 to 2:1. The order of addition of the accelerator components is not critical nor is any special processing required with these additives.

To obtain acceptable cures with the present accelerator systems the amount of sulfur employed for vulcanization can range from about 0.3 to about 6 parts by weight per 100 parts of the rubber. It is generally preferred, however, that the sulfur be present from about 0.5 to about 3 parts per 100 parts of the rubber. If sulfur donors such as dithiodimorpholine are employed the amount required will be varied to supply these amounts of sulfur on a theoretical basis. The amount of sulfur will be varied depending on the temperature of cure, the particular rubber, the cure time and the degree of cure desired.

The present accelerator systems are useful for a wide variety of rubber compositions which may additionally contain conventional processing aids and oils, fillers, reinforcing agents, extenders, curing additives, cure retardants and modifiers, stabilizers, antioxidants, antiozonants and the like.

The following Examples serve to illustrate the invention more fully but are not intended to limit the scope thereof. In these examples all parts and percentages are reported on a weight basis unless otherwise indicated. Cure and scorch properties were determined with a cone curometer such as described in U.S. Pat. No. 3,494,172 by measuring the torque (in/lbs.) developed with time (min.). Data obtained from the resulting cure curves are as follows: Cure time ($T_c$) the time required to reach 90% of maximum torque ($\tau_{max.}$); scorch time ($T_s$) the time required for the torque to increase two in/lbs. over the minimum torque ($\tau_{min.}$); cure rate ($CR_{max.}$) equal $\Delta\tau/\Delta T$ determined in lbs./min. at a section of the curve having maximum slope.

EXAMPLE I

A rubber masterbatch was prepared as follows:

| Ingredient | Parts by Weight |
|---|---|
| SBR | 65.0 |
| Cis-polybutadiene | 35.0 |
| N-285 carbon black | 70.0 |
| Aromatic oil | 40.6 |
| Zinc oxide | 2.00 |
| Stearic acid | 1.00 |
| Processing oil - heavy | 2.50 |
| 2,2,4-trimethyldihydroquinoline | 2.00 |
| N,N'-di-2-octyl-p-phenylene diamine | 1.70 |

This compound contains 100 parts by weight of rubber. The SBR contains about 23.5% styrene and has a Mooney value (4 minutes at 212°) of 46–58.

An accelerator system comprised of zinc dimethyldithiocarbamate (methyl zimate) and an amine-blocked diisocyanate of pyrrolidine and diphenylmethane-p,p'-diisocyanate (PYR/MDI) was evaluated in the above masterbatch. Results are compared to the cure obtained using methyl zimate alone. The PYR/MDI, zimate, and sulfur were milled into the rubber masterbatch at 150°±5°F. About a 12 to 15 gram sample was placed in the cone curometer cavity and evaluated over the temperature range of 220°F. to 360°F. Torque values were measured, and $T_c$, $T_s$, and $CR_{max.}$ values determined. $T_c$ was not obtained at temperatures below 330°F. because of the long times to arrive at cure.

TABLE 1

| Sample | Curatives Pts/100 Rubber | Property | Cone Curometer Data Temperature | | | | |
|---|---|---|---|---|---|---|---|
| | | | 360°F. | 330°F. | 280°F. | 240°F. | 220°F. |
| 1 | 1.32 methyl zimate 1.10 sulfur | $\tau_{max.}$ | 72 | | | | |
| | | $T_c$ | 1.49 | 2.65 | | | |
| | | $T_s$ | .72 | 1.27 | 4.58 | 21.1 | 49.6 |
| | | $CR_{max.}$ | 78.3 | 39.6 | 9.5 | 1.87 | .50 |

TABLE 1—Continued

| Sample | Curatives Pts/100 Rubber | Property | Cone Curometer Data Temperature | | | | |
|---|---|---|---|---|---|---|---|
| | | | 360°F. | 330°F. | 280°F. | 240°F. | 220°F. |
| 2 | 2.64 methyl zimate 1.10 sulfur | $\tau_{max.}$ $T_c$ $T_s$ $CR_{max.}$ | 80 1.37 .57 153.0 | 1.90 1.24 76.8 | 3.68 14.0 | 20.3 1.75 | 43.0 .69 |
| 3 | 1.32 methyl zimate 1.45 PYR/MDI 1.10 sulfur | $\tau_{max.}$ $T_c$ $T_s$ $CR_{max.}$ | 76 .98 .58 165.0 | 1.76 1.06 82.0 | 3.80 15.1 | 19.7 2.25 | 42.4 .72 |
| 4 | 0.66 methyl zimate 0.72 PYR/MDI 1.10 sulfur | $\tau_{max.}$ $T_c$ $T_s$ $CR_{max.}$ | 61 1.50 .73 84 | 2.34 1.30 46.4 | 5.56 9.25 | 23.9 1.87 | 48.4 .63 |

The data shows that the amine-blocked diisocyanate increased the cure rate at all of the temperatures (Sample 1 v. Sample 3). The increase in cure rate obtained was even greater than if the level of methyl zimate accelerator is doubled (Samples 1 and 2 v. Sample 3). A comparison of Samples 1 and 4 shows that a cure rate as fast as or faster than that yielded with 1.32 parts of methyl zimate can be obtained with one-half of that level (0.66 part) and the PYR/MDI adduct. All of these improvements are obtained without a proportional decrease in scorch time.

EXAMPLE II

Example I was essentially repeated except for the elimination of the stearic acid and zinc oxide (vulcanization activator) from the masterbatch. The data shows that the vulcanization activator is not essential to obtain the improvements of the invention when the thiuram compound is in a metal salt form. In this case, zinc dimethyldithiocarbamate was used as the thiuram compound.

the masterbatch is as follows (in parts by weight):

| | |
|---|---|
| SBR 1710[1] | 50 |
| Polybutadiene[2] | 50 |
| N285 carbon black | 85 |
| Aromatic oil | 60 |
| Stearic acid | 2 |
| Zinc oxide | 3 |
| Agerite Resin D[3] | 2 |
| Antioxidant[4] | 1.7 |

[1]23.5% styrene, 76.5% butadiene by weight
[2]98% cis-1,4-butadiene
[3]polymerized trimethylol/dihydroquinoline
[4]N-1,3-dimethylbutyl-N'-phenyl-p-phenylenediamine Portions of the masterbatch were placed on a two-roll mill maintained at 150°±5°F., and sulful, tetramethylithiuram monosulfide, and the blocked diisocyanate added. 12 to 15 gram samples of the stock were then evaluated as to scorch time, cure time, and maximum torque obtained, using a cone curometer. The sulfur was used at 1.25 parts per 100 parts by weight of the rubber, and the thiuram sulfide at 1.26 parts by weight per 100 parts of the rubber. Comparisons between the amine-blocked diisocyanates of this invention and known blocked isocyanates or ureas are made on an equal mole basis, adjusted for the moles of amine liberated per compound if need be.

The samples prepared and data obtained are as follows:

TABLE 2

| Sample | Curatives Pts/100 Rubber | Property | Cone Curometer Data Temperature | | | | |
|---|---|---|---|---|---|---|---|
| | | | 360°F. | 330°F. | 280°F. | 240°F. | 220°F. |
| 1 | 1.32 methyl zimate 1.10 sulfur | $\tau_{max.}$ $T_c$ $T_s$ $CR_{max.}$ | 60 1.13 .63 93 | 2.29 1.07 60.2 | 3.51 18.4 | 14.3 5.5 | 32.4 2.35 |
| 2 | 1.32 methyl zimate 1.45 PYR/MDI 1.10 sulfur | $\tau_{max.}$ $T_c$ $T_s$ $CR_{max.}$ | 65 .85 .51 137 | 1.39 .91 87.4 | 3.27 22.1 | 13.8 6.1 | 29.6 2.24 |
| 3 | 1.32 methyl zimate 1.28 DMA/MDI[a] 1.10 sulfur | $\tau_{max.}$ $T_c$ $T_s$ $CR_{max.}$ | 61 .90 .53 121 | 1.46 .92 80.0 | 3.44 20.2 | 13.6 50 | 27.4 2.13 |

[a]Dimethylamine/diphenylmethane-p,p'-diisocyanate adduct

EXAMPLE III

A rubber masterbatch was prepared for use in evaluating various blocked isocyanates. The composition of

| Sample | Blocked Isocyanate | Parts per 100 rubber | $T_s$ at 240°F., minutes | $T_c$ at 360°F., minutes | $T_c$ at 360°F. $T_s$ at 240°F. |
|---|---|---|---|---|---|
| Control | — | — | 80.2 | 1.90 | — |
| 1 | monomethyl urea | 0.56 | 50.0 | 1.53 | 0.0306 |
| 2 | 1,3-dimethyl urea | 0.63 | 55.8 | 1.60 | 0.0286 |
| 3 | 1,1-diethyl urea | 0.86 | 46.6 | 1.44 | 0.0309 |
| 4 | 1,1-diethyl-3-n-butyl urea | 1.26 | 55.6 | 1.57 | 0.0282 |
| 5 | 1-ethyl-1-phenyl-3-n-butyl urea | 1.61 | 74.3 | 1.86 | 0.0251 |
| 6 | 1-phenyl urea | 0.99 | 64.2 | 1.70 | 0.0265 |
| 7 | diphenylamine/toluene diisocyanate | 1.88 | 89.7 | 2.00 | 0.0223 |
| 8 | dimethylamine/toluene diisocyanate | 0.96 | 55.0 | 1.52 | 0.0276 |

| Sample | Blocked Isocyanate | Parts per 100 rubber | $T_s$ at 240°F., minutes | $T_c$ at 360°F., minutes | $\dfrac{T_c \text{ at } 360°F.}{T_s \text{ at } 240°F.}$ |
|---|---|---|---|---|---|
| 9 | dimethylamine/diphenylmethane-p,p'-diisocyanate | 1.24 | 71.5 | 1.55 | 0.0217 |
| 10 | pyrrolidine/diphenylmethane-p,p'-diisocyanate | 1.44 | 72.4 | 1.57 | 0.0217 |
| 11 | pyrrolidine/p-phenylene diisothiocyanate | 1.24 | 72.5 | 1.50 | 0.0206 |

The control sample contains no blocked isocyanate. Samples 1 to 6 use blocked isocyanates within the scope of U.S. Pat. No. 1,904,573; i.e., monoisocyanates. Sample 7 uses the diphenylamine/toluene diisocyanate adduct shown in U.S. Pat. No. 3,135,716. Sample 8 uses the reaction product of dimethylamine and a monophenyldiisocyanate which is outside the scope of the present invention. Samples 9 to 11 employed amine-blocked diisocyanates of the invention. A high value of $T_s$ at 240°F. indicates good processing safety. A low value of $T_c$ at 360°F. indicates fast cure at vulcanization temperature. A low value for the ratio $T_c$ 360°F./$T_s$ 240°F. indicates a good balance between processing (scorch) safety and rapid cure. The lower the value, the more ideal the balance between safety and rate of cure.

It is seen in the data that the amine-blocked diisocyanates of the invention (samples 9 to 11) yielded lower $T_c/T_s$ values than the known blocked isocyanates. Of further note, Samples 5, 6 and 7 are all prepared using phenylamines, and all three samples have high cure times at 360°F. which leads to decreased product output. The high $T_c$ times result from the use of the weak aromatic amines. Sample 7, using the diphenylamine adduct, actually had a longer cure time; i.e., retarded the cure, than the use of no amine at all (see the $T_c$ of the control sample). Sample 8 using a monophenyl diisocyanate yielded a significantly inferior balance of scorch safety and cure rate, i.e., a high $T_c/T_s$ value, compared to Samples 9 and 10 employing the diphenyl diisocyanates of this invention. It can be seen in Sample 8 that the amine is strong and fast cure resulted, but the monophenyl diisocyanate released the amine too early, yielding poor scorch safety. Sample 10 uses a diisothiocyanate of the invention, and an excellent balance of safety and cure rate was obtained.

I claim:

1. A composition comprising (1) a sulfur-vulcanizable rubber having from about 0.5% to 50% by weight of olefinic unsaturation, (2) sulfur or a sulfur donor, (3) a metal vulcanization activator selected from the group consisting of metal oxides, hydroxides, and salts wherein the metal is selected from the group consisting of zinc, cadmium, lead, calcium and iron, and (4) an accelerator system consisting essentially of (a) a thiuram compound selected from the group consisting of thiuram sulfide accelerators of the formula

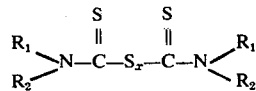

wherein $R_1$ and $R_2$ are, independently, an alkyl radical containing 1 to 6 carbon atoms, a cycloalkyl group containing from 5 to 7 carbon atoms, or an aryl, aralkyl, or alkaryl group containing 6 to 10 carbon atoms, or $R_1$ and $R_2$ jointly form a bivalent hydrocarbon radical containing 4 to 7 carbon atoms, and dithiocarbamate accelerators of the formula

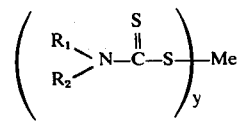

wherein $R_1$ and $R_2$ are defined as above, $y$ is 1 to 4, and Me is a metal selected from the group consisting of sodium, potassium, zinc, copper, lead, cadmium, bismuth, tellurium, and selenium; and (b) an amine-blocked diisocyanate of (i) a heterocyclic amine having a pK dissociation constant of about 4 or below and (ii) a diisocyanate selected from the group consisting of diphenyl-diisocyanates and aromatic diisothiocyanates.

2. A composition of claim 1 wherein the total weight of thiuram compound and amine-blocked diisocyanate is from about 0.5 to 8 parts by weight per 100 parts by weight of the rubber, and the weight ratio of the amine-blocked diisocyanate to thiuram compound is from about 0.2:1 to 4:1.

3. A composition of claim 2 wherein the amine-blocked diisocyanate is derived from (i) a heterocyclic amine selected from the group consisting of pyrrolidine, piperidine, 2-pipecoline, 3-pipecoline, and 4-pipecoline and (ii) a diisocyanate selected from the group consisting of diphenylmethane-p,p'-diisocyanate, di(3-methylphenyl)methane-p,p'-diisocyanate, diphenylisopropylidene-p,p'-diisocyanate, di(3-methylphenyl)-p,p'-diisocyanate, di(3-methoxyphenyl)p,p'-diisocyanate, p-phenylene diisothiocyanate, p-toluene diisothiocyanate, p-3-fluorophenyl diisothiocyanate, naphthalene-1,4-diisothiocyanate, and naphthalene-1,8-diisothiocyanate.

4. A composition of claim 3 wherein the thiuram compound is zinc dimethyldithiocarbamate.

5. A composition of claim 4 wherein the amine-blocked diisocyanate is of pyrrolidine and diphenylmethane-p,p'-diisocyanate.

6. A composition of claim 3 wherein the thiuram compound is tetramethylthiuram monosulfide.

7. A composition of claim 6 wherein the amine-blocked diisocyanate is of pyrrolidine and diphenylmethane-p,p'-diisocyanate.

8. A composition of claim 6 wherein the amine-blocked diisocyanate is of pyrrolidine and p-phenylene diisothiocyanate.

* * * * *